United States Patent Office 2,734,885
Patented Feb. 14, 1956

2,734,885

RUBBER TREATMENT

Kenneth W. Doak, Bloomfield, N. J., assignor to United States Rubber Company, New York, N. Y., a corporation of New Jersey No Drawing. Application August 31, 1954,
Serial No. 453,441

10 Claims. (Cl. 260—41.5)

This invention relates to improvements in the technique of processing high-carbon black rubber mixes prior to vulcanization thereof, and more particularly to improvements in so-called "low-hysteresis" processing of mixtures of carbon black and rubber.

The technique of processing high-carbon black and rubber mixes prior to vulcanization thereof, whereby to obtain vulcanizates with improvements in physical and chemical properties, is described in Gerke et al. U. S. P. 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

These improved vulcanizates are obtained, in accordance with the Gerke et al. technique, by incorporating in the rubber a relatively large amount of carbon black, for example, at least 25 parts, and preferably in the case of tire treads at least 40 parts by weight of carbon black per 100 parts by weight of rubber, and then subjecting a substantially homogeneous mixture of the ingredients to a heat treatment at a temperature substantially above 250° F., the preferred temperature being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes duration will be found suitable for most purposes, and particularly within the preferred temperature range.

An object of the present invention is to provide new chemical promoters for the processing of rubber and carbon black mixes as described in U. S. P. 2,118,601 whereby to obtain high electrical resistance or low torsional hysteresis of tread stocks. A further object is to provide substantial decreases in the time of the low-hysteresis processing by the use of the herein disclosed chemicals with consequent increase in the capacity and output of equipment. Other objects will appear more fully hereinafter.

I have found that malonyl compounds which have two chlorine atoms, or two bromine atoms, or one chlorine atom and one bromine atom, on the aliphatic carbon atom adjacent to the two carbonyl groups substantially decrease the time and/or reduce the temperature required for low-hysteresis processing. Examples of these compounds are dichloromalonic acid, ethyl dichloromalonate, alpha,alpha-dichloromalonamide, alpha,alpha-dichloromalonyl urea, ethyl chlorobromomalonate, alpha,alpha-dibromomalonyl urea, ethyl dibromomalonate, and alpha,alpha-dibromomalonamide.

The preferred promoting compounds are alpha,alpha-dichloromalonyl urea, alpha,alpha-dibromomalonyl urea, and ethyl dibromomalonate.

These promoters are effective in natural rubber e. g., Hevea rubber, in synthetic rubbery homopolymers of aliphatic conjugated diolefin hydrocarbons, especially butadiene and isoprene, and in synthetic rubbery copolymers of such diolefin hydrocarbons with copolymerizable monoolefinic compounds, such as isobutylene, styrene, alpha-methyl styrene, methyl acrylate, ethyl acrylate, methyl methacrylate, acrylonitrile, methacrylonitrile, methyl vinyl ketone, methyl isopropenyl ketone, and mono-vinylpyridines. They are particularly effective in natural rubber; in copolymers of a major proportion, typically from 90 to 99.5%, of isobutylene and a minor proportion, typically corresponding from 10 to 0.5%, of an aliphatic conjugated diolefin hydrocarbon, especially butadiene or isoprene (known commercially as "butyl rubber"); and in copolymers of butadiene and styrene (known as "GR-S").

The process of my invention comprises mixing the said rubber with a relatively large amount of a rubber-reinforcing carbon black and a relatively small but effective amount, typically from 1 to 5 parts per 100 parts of rubbery material, of the promoter compound, and heating this mixture at temperatures in the range from 275° F. to a temperature just short of that at which the rubber would be injured, and masticating the mix during and/or after such heat treatment, to bring about the desired changes in the rubber and carbon black mixture whereby a vulcanizate of this mixture will have a considerably reduced torsional hysteresis and a considerably increased electrical resistivity. This heat treatment is carried out in the absence of vulcanizing agents, e. g., sulfur or sulfur-yielding compounds. Following the heat treatment, the vulcanizing and other desired compounding ingredients including conventional accelerators and the like are intimately incorporated in the conventional manner, after which the mixture is shaped and vulcanized in the usual way.

Any carbon black which is capable of reinforcing the rubber can be used in the practice of my invention. I usually use either a furnace black or a channel black. Those skilled in the art will appreciate that the type of black is often selected with reference to the particular rubber employed. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can be as great as 100 parts per 100 parts of rubber.

In the preferred practice of my invention, the heat treatment of the mixture of rubber, carbon black and the promoter compound is carried out by mastication at temperatures in the range 275–400° F., preferably in the range 300–400° F., with any suitable type of masticating equipment such as an open two-roll rubber mill or preferably an internal rubber mixer, especially a Banbury mixer. The Banbury mixer is particularly advantageous because it exerts a severe masticatory action upon the charge and because it conserves the heat generated by the mixing action and this heat greatly aids in elevation of the stock temperature to within the desired range. Depending upon the size and operating speed of the Banbury mixer, and other factors, extraneous heat may or may not need to be applied to bring the stock temperature within the desired temperature range and to hold it there. If desired, extraneous cooling may be applied to keep the temperature from rising above the desired level.

The optimum duration of the heat treatment will vary depending upon many factors, including the temperature of heat treatment, type of heat treatment, i. e., whether it is static or dynamic, type of equipment used, e. g., in the case of masticatory heat treatment whether an open rubber mill or a Banbury or other type of internal mixer is used, amount of promoter used, etc. In any event, the treating time will be considerably shorter, at given temperature conditions, than the time required when the promoter is omitted. In the case of the preferred masticatory treatment, times of the order of 5 to 30 minutes will generally be adequate for the purposes of my invention, the longer times being used at the lower temperatures and vice versa. It is well known that different rubbers vary as to the highest temperatures they can withstand without harm and the time and temperature should of course be so regulated as to not impair the properties of the final vulcanizate.

When my invention is applied to "Butyl rubber," the heat treatment is usually performed at a higher temperature and for a longer time than is the case with natural rubber or "GR–S," in order to bring about the same reduction in torsional hysteresis and increase in electrical resistivity. With butyl rubber a temperature of at least 325° F. is preferred, mastication at 325–400° F. being especially preferred.

It is preferable to form an intimate mixture of the rubber, carbon black and promoter at a relatively low temperature, i. e., below 275° F., in order to avoid premature reaction of the promoter, whereby its promoting effect upon the low-hysteresis processing would be seriously reduced.

It will be seen that my process comprises the following essential steps:

1. Thoroughly mixing the rubber, carbon black and promoter by ordinary technique at a relatively low temperature.
2. Heat-treating the resulting mixture, either by mastication or static treatment, at 275° F. or higher, for a time sufficiently long to substantially decrease the torsional hysteresis and/or substantially increase the electrical resistivity of the final vulcanizate.
3. Masticating the mixture during and/or after the heat treatment, or alternately therewith. When static heat treatment is employed, this mastication will often take place concomitantly with Step 4.
4. Incorporating vulcanizing and other ingredients. Usually these ingredients are incorporated during the mastication following the heat treatment. They are of course incorporated at a temperature sufficiently low to preclude vulcanization or scorching.
5. Shaping, and
6. Vulcanizing the shaped mixture.

It will be understood that the entire process of my invention is controlled within limits avoiding serious degradation of the rubber, it being known that either excessive milling of rubber in air or excessive heating of rubber at elevated temperatures tends to break down or degrade the rubber molecules. Rubber vulcanizates made from degraded rubber have unusually low tensile strength and poor resistance to tear. In practicing my invention, the tensile strength of the vulcanizates need not be lowered more than 10% by the heat-treating step.

The following examples illustrate the preferred methods of practicing the invention. All parts are by weight.

*Example 1*

A masterbatch is prepared in a conventional manner by mixing together 100 parts of Hevea rubber, 50 parts of carbon black (a medium processing channel black known commercially as "Spheron #6"), and 5 parts of stearic acid, in a Banbury mixer or on a two-roll rubber mill. To 155 parts of this masterbatch is added, at a temperature of 175–225° F., 2.0 parts of dichloromalonylurea or 3.2 parts of ethyl dibromomalonate. The stocks are then heated 10 minutes on a two-roll mill, with a roll temperature of 290° F. stock temperature 300–310° F.). Vulcanizing ingredients (2 parts of zinc oxide, 1 part of accelerator, 1 part of antioxidant, and 2.6 parts of sulfur) are then added in the usual manner, and the stocks are vulcanized 45 minutes at 287° F. A control stock is prepared in an identical manner, except that no promoter is used. Specific electrical resistivity and torsional hysteresis are measured.

| Promoter | ML–4 (212° F.) | Log Resistivity | Tors. Hyst., 280° F. |
| --- | --- | --- | --- |
| None | 44 | 7.2 | 0.127 |
| Dichloromalonylurea | 44 | >13.0 | .088 |
| Ethyl dibromomalonate | 33 | >13.0 | .068 |

The practice of the invention has increased the specific electrical resistivity by a factor of almost 1,000,000, and has reduced the torsional hysteresis by 31–46%. In the absence of promoter, a longer time (over 30 minutes) would be required to obtain this result.

*Example 2*

To a masterbatch of a butadiene-styrene copolymer (polymerized at 41° F.) containing 55 parts of HAF black (a high abrasion furnace black known commercially as "Philblack-O") is added, on a two-roll mill at 150–225° F., 6 parts of hydrocarbon softener, and 2.0 parts of dichloromalonylurea or 3.2 parts of ethyl dibromomalonate. The stocks are heated on the mill for 10 minutes, with a stock temperature of 300–310° F. A control stock is prepared in an identical manner, except that no promoter is used. The stocks are vulcanized, and specific electrical resistivity is measured.

| Promoter | ML–4 (212° F.) | Log Resistivity |
| --- | --- | --- |
| None | 76 | 7.9 |
| Dichloromalonylurea | 105 | 13.0 |
| Ethyl dibromomalonate | 85 | 11.1 |

The practice of the invention has thus increased the specific electrical resistivity by a factor of approximately 1000 to 100,000.

*Example 3*

An experiment was carried out in a manner similar to Example 2, except that 2.9 parts of dibromomalonylurea was used as the promoter. Log resistivity was increased from 9.0 to >13.0.

*Example 4*

A masterbatch is prepared by mixing together in a conventional manner 100 parts of a butadiene-styrene copolymer, 52 parts of carbon black ("Spheron #6"), 6 parts of hydrocarbon softener, and 1 part of stearic acid. To 159 parts of this masterbatch is added 2.5 parts of ethyl dibromomalonate at a temperature below 225° F. The stock is then masticated 6 minutes in a Banbury mixer at 325° F. Vulcanizing ingredients (3 parts of zinc oxide, 1 part of 2-mercaptobenzothiazole, 0.4 part of diphenylguanidine, and 2 parts of sulfur) are then added in the usual manner, and the stocks are vulcanized 60 minutes at 293° F. A control stock is prepared in an identical manner, except that no ethyl dibromomalonate is used. Specific electrical resistivity and torsional hysteresis are measured.

| Promoter | ML–4 (212° F.) | Log Resistivity | Tors. Hyst., 280° F. |
| --- | --- | --- | --- |
| None | 69 | 8.5 | 0.151 |
| Ethyl dibromomalonate | 92 | 12.9 | .100 |

The practice of the invention has increased the specific electrical resistivity by a factor of over 25,000 and has reduced the torsional hysteresis by nearly 35%.

*Example 5*

A masterbatch is prepared by mixing together 100 parts of a copolymer of isobutylene and isoprene (known commercially as "Butyl rubber") and 50 parts of carbon black ("Spheron #6"). To this mixture is added 1.5 parts of ethyl dibromomalonate, at a stock temperature below 250° F. The mixture is then masticated in a laboratory Banbury for 15 minutes at 375° F. The stock is then vulcanized in a conventional manner after being mixed with 5 parts of zinc oxide, 3 parts of stearic acid, 0.5 part of 2-mercaptobenzothiazole, 1 part of tetramethyl thiuram disulfide, and 2 parts of sulfur (cure, 45 minutes at 293° F.). A control stock is prepared in an identical manner, except that no ethyl dibromomalonate is used.

| Promoter | Log Resistivity | Tors. Hyst., 280° F. |
|---|---|---|
| None | 6.9 | 0.166 |
| Ethyl dibromomalonate | 12.5 | .087 |

The practice of the invention has increased the specific electrical resistivity by a factor of about 400,000, and has decreased the torsional hysteresis by 48%.

Although I have disclosed my invention with particular emphasis upon the preferred practice wherein the heat treatment is accompanied with mastication, nevertheless, as has been indicated, my invention can be practiced by carrying out the heat treatment under static conditions. For example, I may intimately mix the rubber, carbon black and the promoter in any suitable manner and then heat this mixture at 275–400° F. without simultaneously masticating it, the heat-treated mixture being subsequently masticated and compounded with conventional compounding and vulcanizing ingredients followed by shaping and vulcanizing in the usual way. The static heat treatment can be conducted by placing slabs of the stock in an oven heated to a suitable temperature, or slabs of hot stock can be stacked up and allowed to stand for several hours, preferably under relatively non-heat-conductive conditions, in order to maintain the mixture at the temperature of 275–400° F. for as long as reasonably possible. If desired, the slabs can be wrapped with a suitable insulating blanket to cause prolonged retention of heat. Such static heat treatment has the advantage of releasing the Banbury equipment from use for carrying out the heat treatment and this may be desirable under certain conditions.

The electrical resistivity values given in the above examples were determined by measuring the resistance of a specimen of known thickness (about 0.1 inch) placed between mercury electrodes, under a potential difference of 135 volts, using a sensitive galvanometer with an Ayrton shunt. The logarithm (to base 10) of the specific electrical resistivity (expressed in ohm-cms.) is designated "Log Resistivity."

The torsional hysteresis figures represent the logarithmic decrement (to base 10) of the observed amplitudes of successive oscillations of a torsion pendulum, measured at 280° F. with an apparatus consisting essentially of a torsion pendulum in which the sample of rubber tested supplies the restoring force when the pendulum is deflected. For further details of this test see Gerke et al. 2,118,601.

Having thus described my invention, what I claim and desire to protect by Letters Patent is:

1. A process which comprises mixing rubber selected from the group consisting of natural rubber, synthetic rubbery homopolymers of aliphatic conjugated diolefin hydrocarbons, and synthetic rubbery copolymers of said diolefin hydrocarbons with copolymerizable monoolefinic compounds with a relatively large amount of rubber-reinforcing carbon black and from 1 to 5 parts, per 100 parts of said rubber, of a malonyl compound having two atoms of halogen selected from the group consisting of chlorine and bromine on the aliphatic carbon atom adjacent to the two carbonyl groups, heating the mixture at a temperature of at least 275° F. but below that at which the rubber would be harmed, masticating the mixture and completing incorporation of vulcanizing and other desired ingredients, shaping the mass, and vulcanizing the resulting shaped mass.

2. A process which comprises mixing rubber selected from the group consisting of natural rubber, synthetic rubbery homopolymers of aliphatic conjugated diolefin hydrocarbons, and synthetic rubbery copolymers of said diolefin hydrocarbons with copolymerizable monoolefinic compounds with a relatively large amount of rubber-reinforcing carbon black and from 1 to 5 parts, per 100 parts of said rubber, of a malonyl compound having two atoms of halogen selected from the group consisting of chlorine and bromine on the aliphatic carbon atom adjacent to the two carbonyl groups, masticating the mixture at a temperature of from 275° to 400° F., thereafter incorporating vulcanizing and other desired ingredients, shaping the mass, and vulcanizing the resulting shaped mass.

3. A process which comprises mixing natural rubber with a relatively large amount of a rubber-reinforcing carbon black and from 1 to 5 parts, per 100 parts of said rubber, of a malonyl compound having two atoms of halogen selected from the group consisting of chlorine and bromine on the aliphatic carbon atom adjacent to the two carbonyl groups, masticating the mixture at a temperature of from 275° to 400° F., thereafter incorporating vulcanizing and other desired ingredients, shaping the mass, and vulcanizing the resulting shaped mass.

4. A process which comprises mixing a rubbery copolymer of butadiene and styrene with a relatively large amount of a rubber-reinforcing carbon black and from 1 to 5 parts, per 100 parts of said copolymer, of a malonyl compound having two atoms of halogen selected from the group consisting of chlorine and bromine on the aliphatic carbon atom adjacent to the two carbonyl groups, masticating the mixture at a temperature of from 275° to 400° F., thereafter incorporating vulcanizing and other desired ingredients, shaping the mass, and vulcanizing the resulting shaped mass.

5. A process which comprises mixing a rubbery copolymer of isobutylene and an aliphatic conjugated diolefin with a relatively large amount of a rubber-reinforcing carbon black and from 1 to 5 parts, per 100 parts of said copolymer, of a malonyl compound having two atoms of halogen selected from the group consisting of chlorine and bromine on the aliphatic carbon atom adjacent to the two carbonyl groups, masticating the mixture at a temperature of from 325° to 400° F., thereafter incorporating vulcanizing and other desired ingredients, shaping the mass, and vulcanizing the resulting shaped mass.

6. A process which comprises mixing Hevea rubber with a relatively large amount of a rubber-reinforcing carbon black and from 1 to 5 parts, per 100 parts of said rubber, of dichloromalonylurea, masticating the mixture at a temperature of from 275° to 400° F., thereafter incorporating vulcanizing and other desired ingredients, shaping the mass, and vulcanizing the resulting shaped mass.

7. A process which comprises mixing Hevea rubber with a relatively large amount of a rubber-reinforcing carbon black and from 1 to 5 parts, per 100 parts of said rubber, of ethyl dibromomalonate, masticating the mixture at a temperature of from 275° to 400° F., thereafter incorporating vulcanizing and other desired ingredients, shaping the mass, and vulcanizing the resulting shaped mass.

8. A process which comprises mixing a rubbery copolymer of butadiene and styrene with a relatively large amount of a rubber-reinforcing carbon black and from 1 to 5 parts, per 100 parts of said copolymer, of dichloromalonylurea, masticating the mixture at a temperature of from 275° to 400° F., thereafter incorporating vulcanizing and other desired ingredients, shaping the mass, and vulcanizing the resulting shaped mass.

9. A process which comprises mixing a rubbery copolymer of butadiene and styrene with a relatively large amount of a rubber-reinforcing carbon black and from 1 to 5 parts, per 100 parts of said copolymer, of ethyl dibromomalonate, masticating the mixture at a temperature of from 275° to 400° F., thereafter incorporating vulcanizing and other desired ingredients, shaping the mass, and vulcanizing the resulting shaped mass.

10. A process which comprises mixing a rubbery copolymer of isobutylene and an aliphatic conjugated diolefin with a relatively large amount of a rubber-reinforcing carbon black and from 1 to 5 parts, per 100 parts of said rubbery copolymer, of ethyl dibromomalonate, masticating the mixture at a temperature of from 325° to 400° F., thereafter incorporating vulcanizing and other desired ingredients, shaping the mass, and vulcanizing the resulting shaped mass.

No references cited.